C. H. FINSON.
WHEEL-HOE.
No 177,390. Patented May 16, 1876.
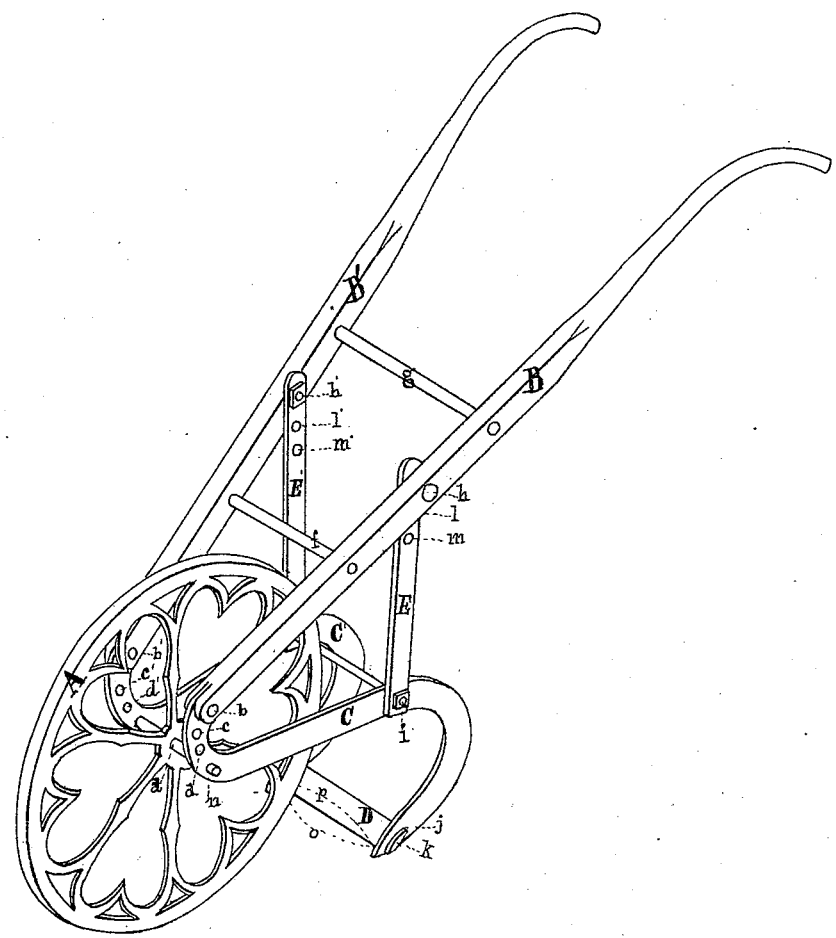
Witnesses
Cornelius V. Baker.
Fred H. Coombs
Inventor
Charles Henry Finson

UNITED STATES PATENT OFFICE.

CHARLES HENRY FINSON, OF PITTSFIELD, ASSIGNOR OF ONE-HALF HIS RIGHT TO HENRY McLAUGHLIN, OF BANGOR, MAINE.

IMPROVEMENT IN WHEEL-HOES.

Specification forming part of Letters Patent No. 177,390, dated May 16, 1876; application filed March 1, 1876.

*To all whom it may concern:*

Be it known that I, CHARLES H. FINSON, of Pittsfield, Somerset county, Maine, have invented certain Improvements in Wheel-Hoes, of which the following is a specification:

The object of my invention is to construct a hoe for cultivating purposes which will work easily and rapidly, and, while it does not require the operator to stoop, enables him to perform a great deal of work very thoroughly and efficiently.

In the accompanying drawing my hoe is shown in perspective.

To enable others skilled in the art to make and use my invention, I will now proceed to describe its construction and operation.

This hoe is constructed with a wheel, A, handles B B, cross-bars $f$ $g$, bent arms C C, connecting-rod $e$—with additional connecting-rods, if necessary—adjusting-braces E E', and knife or blade D. The handles B B' are framed together with the cross-bars $f$ and $g$. The arms C C' are formed with the forward ends bent or curved upward to receive the arbor to the wheel and to allow of being attached to the handles B B' by rivets or bolts $b$ $b'$, while the backward and lower ends are bent or curved downward and forward to receive the blade D. These arms are connected together by the rod $e$ with additional connecting-rods, if found necessary or desirable, and their distance from the handles B B' is regulated by the adjusting-braces E E'.

This hoe presents the superiority, in practice, of having the blade drawn after the wheel by arms which have their draft directly from the hub of the wheel, and in having the arms drawing from each end of the knife or blade, thus making the blade firm to resist an unequal strain at either end; and the adjustments are so perfect and so easily made that a mere child may handle and adjust it.

The arms C C' are formed with such curves as to give the most desirable draft and inclination to the blade, and are fastened to the handles by bolts or rivets at $b$ $b'$, forming a movable joint, and the braces E E' are formed with the holes $h$ $h'$ $l$ $l'$ $m$ $m'$, which enable the braces to be fastened to the handles by bolts and nuts, or by screws, at either of these points, thus increasing or diminishing the distance between the arms C C' and the handles B B', and raising or lowering the handles to a corresponding distance. This adjustment is desirable to suit the varying height of the operator.

Another adjustment is made by changing the wheel from one set of holes to any other set in the forward end of the arms C C'. The arms may be provided with any number of holes for this purpose, but, so far as practice has at present indicated, the three sets of holes, $c$ $c'$, $d$ $d'$, $n$ $n'$, appear to be sufficient.

The connecting-rod $e$ is formed with a screw and nut at each end, which allow of readily spreading the arms and changing the wheel from one set of holes to any other set; and if the wheel is in the holes $n$ $n'$, and should be changed to the holes $c$ $c'$, it will readily be seen that the forward end of the arms C C' will be lowered, and the blade D, being held in a socket, $j$, at the lower end of the arms, will be tipped forward at a greater angle to the surface, and will incline to draw down and cut deeper into the ground.

The blade is held in the arms C C' by means of the socket $j$ at the lower end of each arm, and a longer or shorter blade may be used until the end $k$ may project to any desired length, thus making the hoeing wide or narrow at the pleasure of the operator. A blade of any desirable, and almost any possible, shape may be used, as shown by the dotted lines $o$ and $p$.

I am aware wheel-hoes have been made and used; I therefore do not claim, broadly, the invention of a wheel-hoe or weed-cutter. I do not claim a yoke-piece from which the wheel is hung, and having a cutter-arm connected with such yoke-piece at a point at the rear of the wheel, nor do I claim links connecting the handles with such a yoke; but What I do claim as my invention is as follows:

1. The cutter-arms C C', having the reverse curves, as shown, each arm hung adjustably at one end to the wheel-axle, and connected at their rear ends by the blade or knife D.

2. In combination with the reversely-curved arms C C', hung as shown and described, and connected by the blade D, the handles B B', connected directly to the upper short curves of arms C C' at points near the axis of the wheel.

CHARLES HENRY FINSON.

Witnesses:
 CORNELIUS V. BAKER,
 FRED. H. COOMBS.